July 27, 1965 M. WAHLSTROM ETAL 3,196,752
TRANSMISSION CONVERTING REVERSE DRIVE TO VARIABLE SPEED
Filed Jan. 25, 1962 5 Sheets-Sheet 1
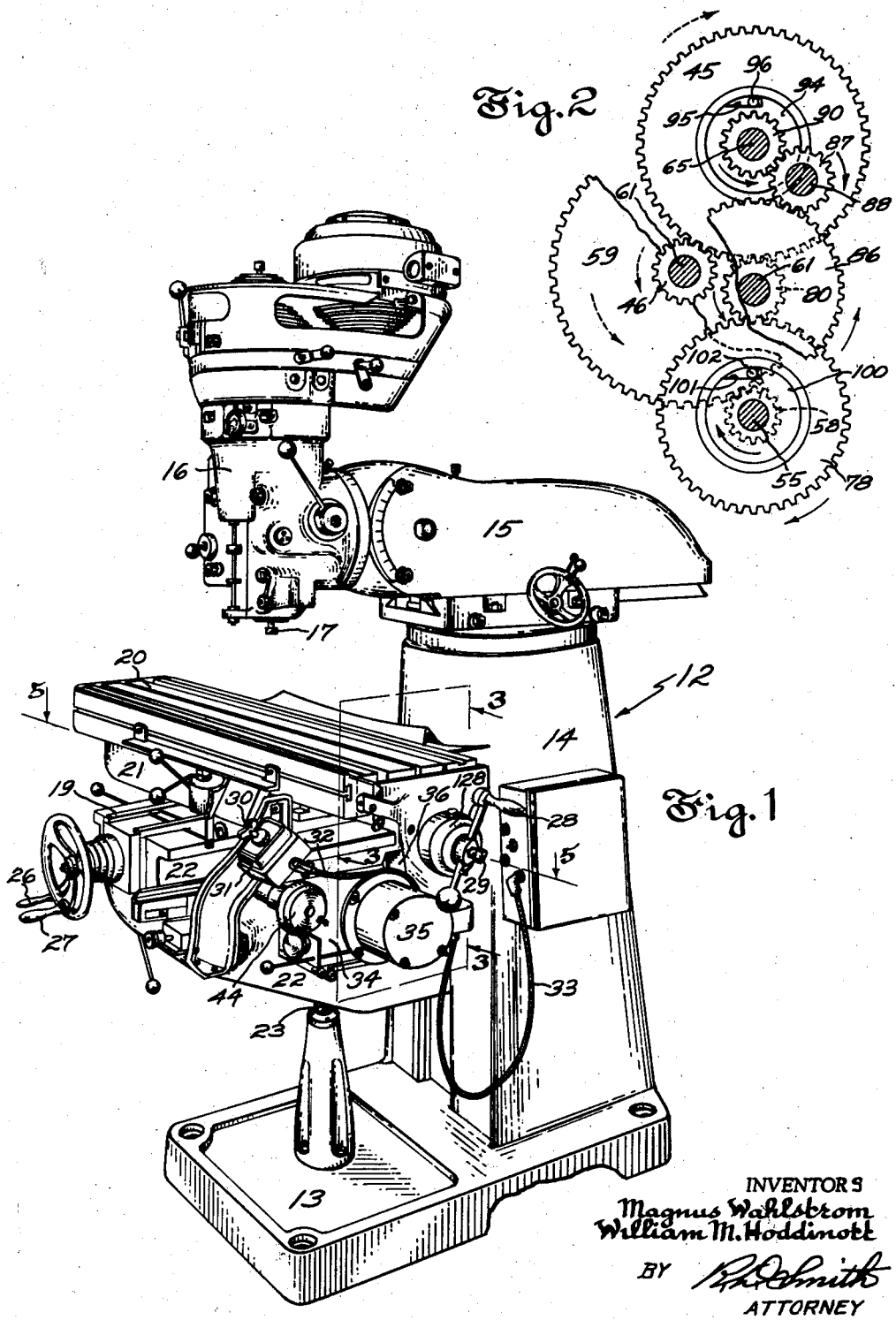
INVENTORS
Magnus Wahlstrom
William M. Hoddinott
BY
ATTORNEY INVENTORS
Magnus Wahlstrom
William M. Hoddinott
BY
ATTORNEY

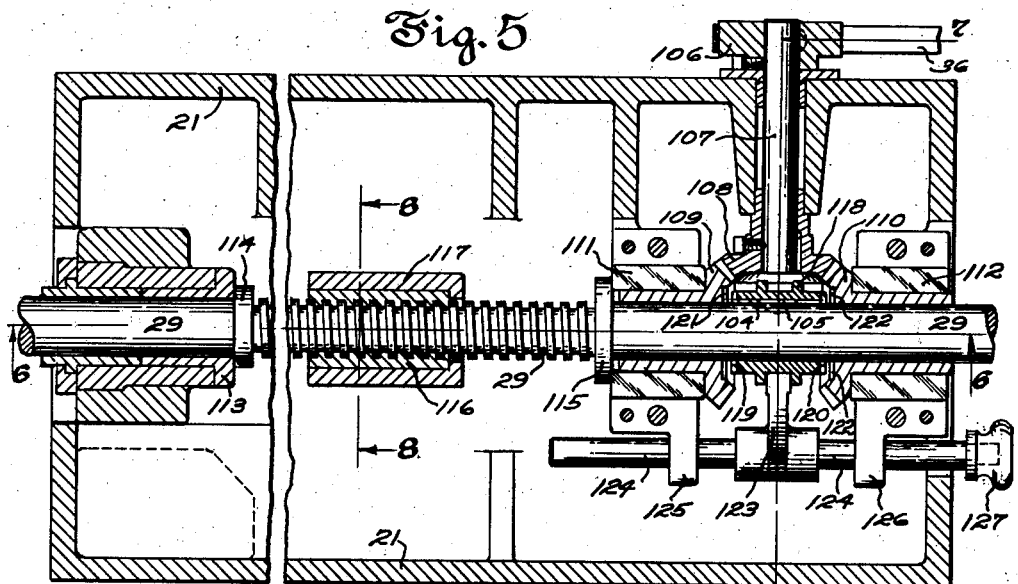
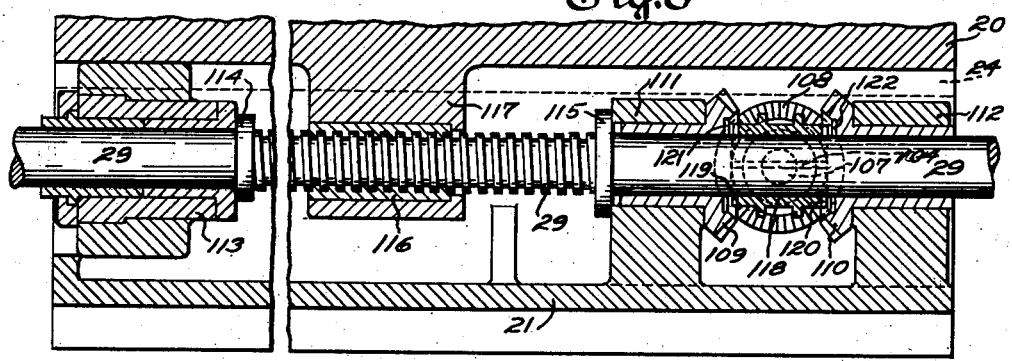
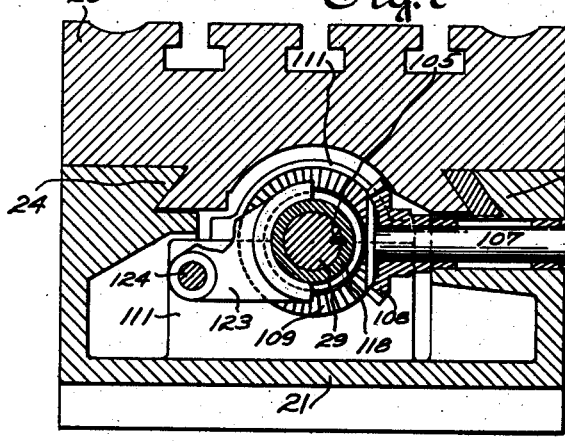
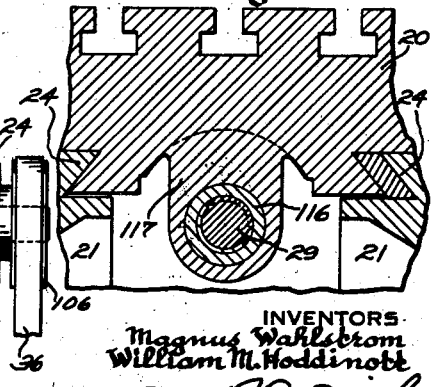

_United States Patent Office_

3,196,752
Patented July 27, 1965

3,196,752
TRANSMISSION CONVERTING REVERSE DRIVE
TO VARIABLE SPEED
Magnus Wahlstrom, Easton, and William M. Hoddinott,
Milford, Conn., assignors to The Bridgeport Machines,
Inc., Bridgeport, Conn., a corporation of Connecticut
Filed Jan. 25, 1962, Ser. No. 168,727
6 Claims. (Cl. 90—21)

This invention relates to gear systems in a power transmission whereby the speed of rotation of an output or load shaft in a continuous direction will be varied in response to reversal of the direction of rotation of an input or power shaft. The herein illustrated embodiment of the improvements is particularly adapted to serve as a power transmission unit for rotating the work table feed screw of a machine tool such as a milling machine.

A speed up of work table feed is desired for advancing the work more rapidly while it is passing from one cutting operation to another than while feeding the work to the cutting action of the tool. Such situation is encountered for instance when cutting is to be performed on only spaced apart portions of a long workpiece or an separate workpieces spaced apart along the work table.

It has been proposed to thus increase the speed of table feed by declutching the table feed screw from a relatively low speed drive and reclutching it to a relatively high speed drive. This requires tiresome manipulation of clutches which wear rapidly in service and gives rise to special problems of lubrication resulting in undesirably high cost of operation and upkeep.

It also has been proposed in a variable speed gear transmission to speed up the rotation of an output shaft in a continuous direction by reversing the direction of running of an input shaft that may be powered at constant speed by an electric motor or other form of prime mover. But transmissions heretofore proposed for this purpose have involved planetary or other gearing arrangements which require that the turning of one or more of the gears be stopped forcibly by applying a brake to cause the shift from low speed drive to high speed drive of the output shaft. The use of brakes possesses similar disadvantages of wear and slippage inherent in frictional devices that are required at one time to arrest and at another time to release moving gears of a power transmitting train.

It is an object of this invention so to associate a train of high speed transmission gears with a train of low speed transmission gears that no unclutching or forceful braking action need be exerted on any power transmitting member of the trains of gears and for freeing either train from the inertia of the unlike speed of the previously running other train.

Another object is to incorporate such trains of transmission gears together with a constant speed reversible motor or other prime mover reversible as to direction of rotation by which both gear trains are powered in a unitary mechanism applicable to the feed screw that causes traverse of the work carrying table of a machine tool, especially a milling machine.

Another object is to leave the usual feed screw turning handle free for manual operation when a motor powered transmission incorporating the present improvements is applied thereto.

Another object is to interpose between the slow speed gear train and the table feeding screw or whatever load is to be driven a system of shiftable speed change gears which may be set individually by manual selection to drive the feed screw at differing low speeds while permitting any of such low speeds to be converted to a super high speed for causing rapid traverse of the work table by merely reversing the direction of the motor or other prime mover by which the transmission is powered.

These and other objects of the invention are explained in fuller particular in the following description of a successful embodiment of the invention having reference to the appended sheets of drawings wherein:

FIG. 1 shows a typical milling machine equipped with rapid traverse power feed of its work table according to the present improvements.

FIG. 2 is a diagram explanative of certain gearing that effects the rapid traverse of the work table.

FIG. 5 is a contracted view taken partially in section on a horizontal plane containing the line 5—5 in FIG. 1, namely the axis of the screw that feeds the work table.

FIGS. 6, 7 and 8 are views taken in section on the planes 6—6, 7—7 and 8—8 in FIG. 5, looking in the directions of the arrows.

Figure 9:
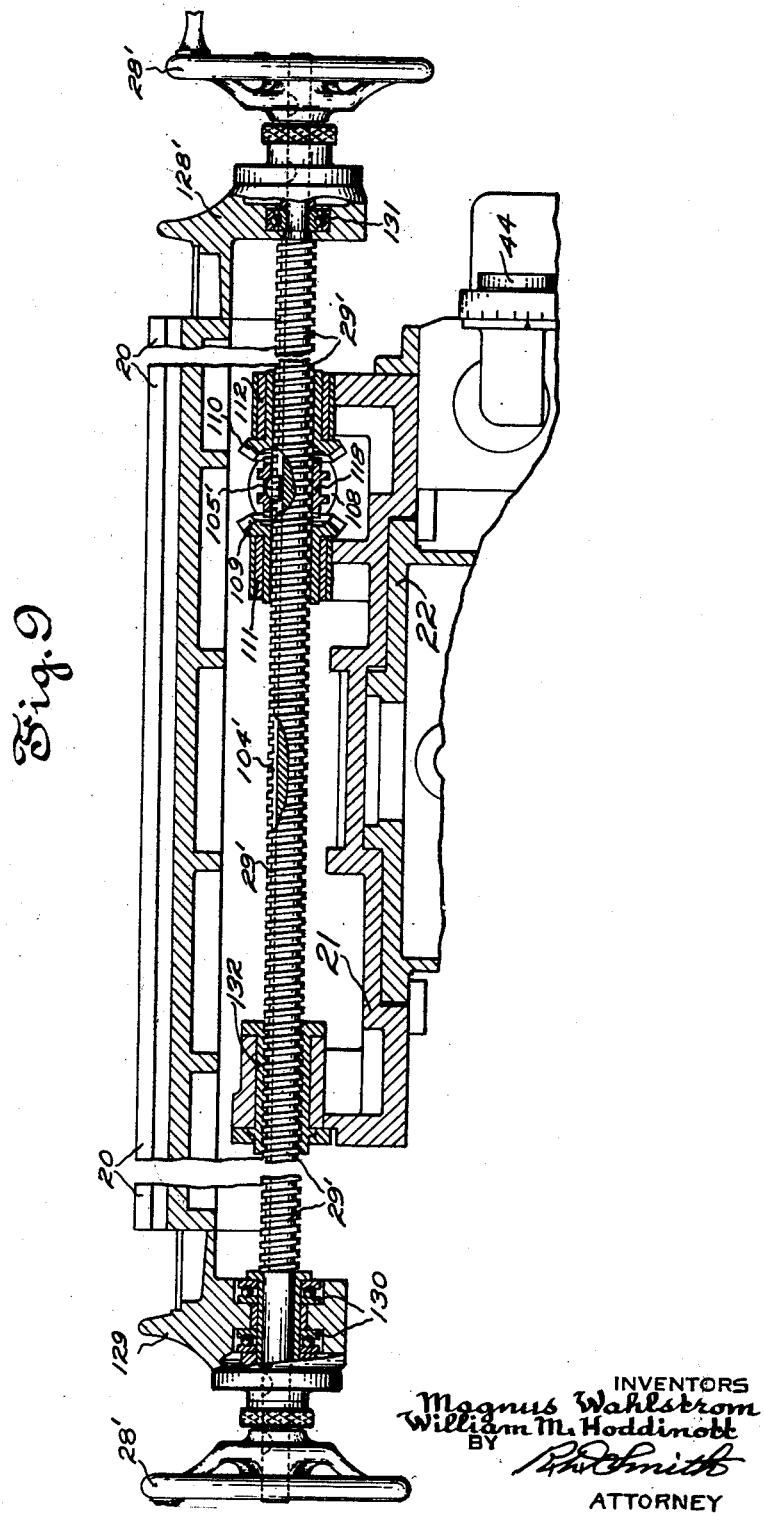

FIG. 9 shows a modified construction of the saddle, the table and the feed screw wherein the feed screw travels lengthwise in unison with the table, the parts being contracted in length.

In FIG. 1 the milling machine 12 comprises a base 13, standard 14, overarm 15 and self-powered machining head 16 carrying the milling cutter 17. In customary manner the work is supported on a table 20 which in turn is slidably supported on crosswise extending ways 24 (FIG. 8) of a saddle 21 which in turn is slidably supported on ways 19 of the knee 22 of the milling machine which knee, as usual, can be raised and lowered by a jack screw 23. The operating shaft (not shown) for the jack screw is turned by a crank handle 26. Another crank handle 27 turns the screw (not shown) that causes saddle 21 to move forward and backward on the knee 22, while a third crank handle 28 affords conventional means for manually turning the feed screw 29 to impel table 20 on saddle 21 crosswise of the milling machine. While a power feed incorporating the present improvements can be applied to any one or more of the three feed screws above mentioned, herein it is shown as applied to the table feeding screw 29.

The present improvements when incorporated in a machine tool are preferably embodied in a unitary mechanism housed in a gear box 34 that is rigidly secured to an end portion of saddle 21. The gear box carries in outboard relation thereto a constant speed electric power motor 35 supplied with current through a flexible cable 33. Automatic feeding of the work (not shown) on table 20 to and past the cutting tool 17 is derived from motor 35 through transmission gearing embodying the invention. The drive is carried forward from the gearing by a non slippable drive belt 36 that turns bevel gears 108 and 109 or 110, either of which latter two gears can be drivingly connected alternatively by a direction shifting clutch member 118 to turn the screw shaft 29 that feeds the work table 20. See FIG. 5.

Motor 35 is reversed as to its direction of rotation by another electric cable 32 leading to any conventional type of motor reversing switch within a housing 31 and operated manually by the switch handle 30 which is within convenient reach of the machine tool operator.

Figure 3:
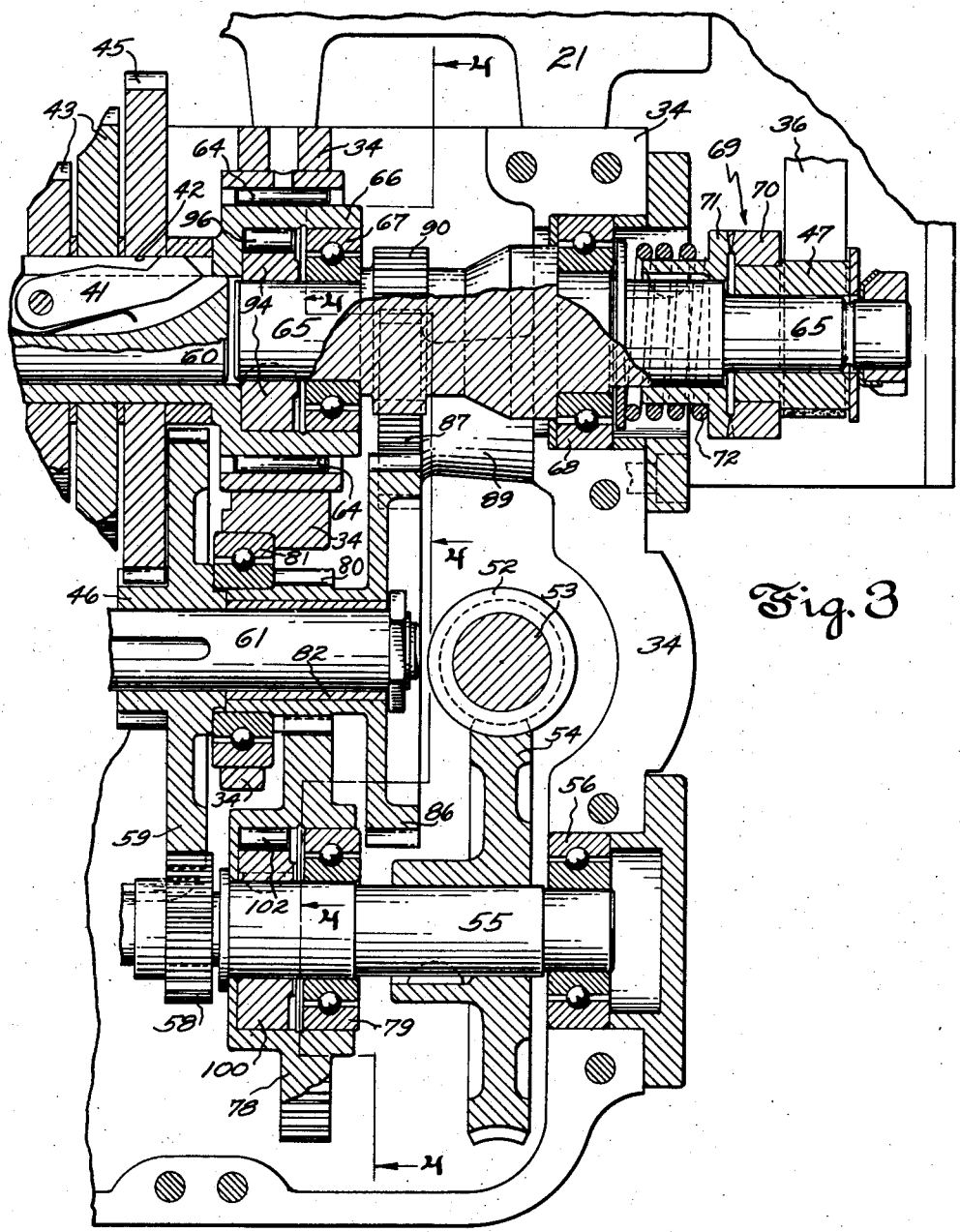
FIG. 3 is an enlarged view taken in section on the vertical plane 3—3—3 in FIG. 1 between the motor and the gear box of the table feeding transmission looking in the direction of the arrows.

Within the gear box 34 there is a conventional set of change speed gears 43 which are only fragmentarily represented in FIG. 3. Gears 43 have keyways 42 selectively engageable by keys 41 pivotally carried in a groove in driven shaft 60 for rotatively interlocking shaft 60 with individual gears 43 having different diameters whereby different speeds of drive are imparted to shaft 60. The selection as to which change gear 43 shall drive shaft 60 at work cutting speeds of table feed is determined by the manually chosen setting of a handle 44 as is well understood in the art. In FIG. 3 one of the change speed gears 45 is shown to be interlocked with driven shaft 60.

For normal speeds of work machining table feed, change gear 45, as best shown in FIG. 3, is driven by a main train of transmission gears comprising the worm 52 on motor shaft 53 that is always in mesh with a worm wheel 54 keyed to shaft 55. This shaft is supported in ball bearings lodged in gear box 34. Only one such bearing is shown at 56. Shaft 55 fixedly carries the drive pinion 58 which is constantly in mesh with a larger gear 59 with which a pinion gear 46 is united. The composite reduction gear 59–46 is free to rotate on a shaft 61 stationed in the frame of the gear box and transmits to change gear 45 a table feeding drive that is derived from motor 35 through the gear train 52, 54, 58, 59 and 46. This train is herein sometimes termed the main train of gears and imparts motion to a load shaft 65 in only one direction of rotation through a one-way clutch connection operative between change gear 45 and load shaft 65 comprising a clutch disc 94 fixed on load shaft 65 and a wedging roller 96 that shifts between binding and non-binding positions in a tapered notch 95 in disc 94.

The driven shaft 60 according to the present improvements is journaled in roller bearings 64 in the frame of gear box and is in end-to-end alignment with the aforesaid load shaft 65 whose left end portion in FIG. 3 occupies a hollow in the enlarged head 66 of the driven shaft 60. Load shaft 65 is journaled in this hollow shaft head 66 by means of a ball bearing 67 and has additional support in a wall of the gear box by being journaled in a ball bearing 68 from which it projects into outboard relation to the gear box and carries loosely rotatable thereon the load pulley 47. This pulley is driven through a slip clutch 69 which comprises a clutch member 70 fixed on the pulley 47 and a clutch member 71 slidably keyed to load shaft 65 so that radially ribbed faces of clutch members 70 and 71 engage axially and for safety against overloading are constantly biased into slippable driving engagement by a compressed spring coil 72.

Figure 4:
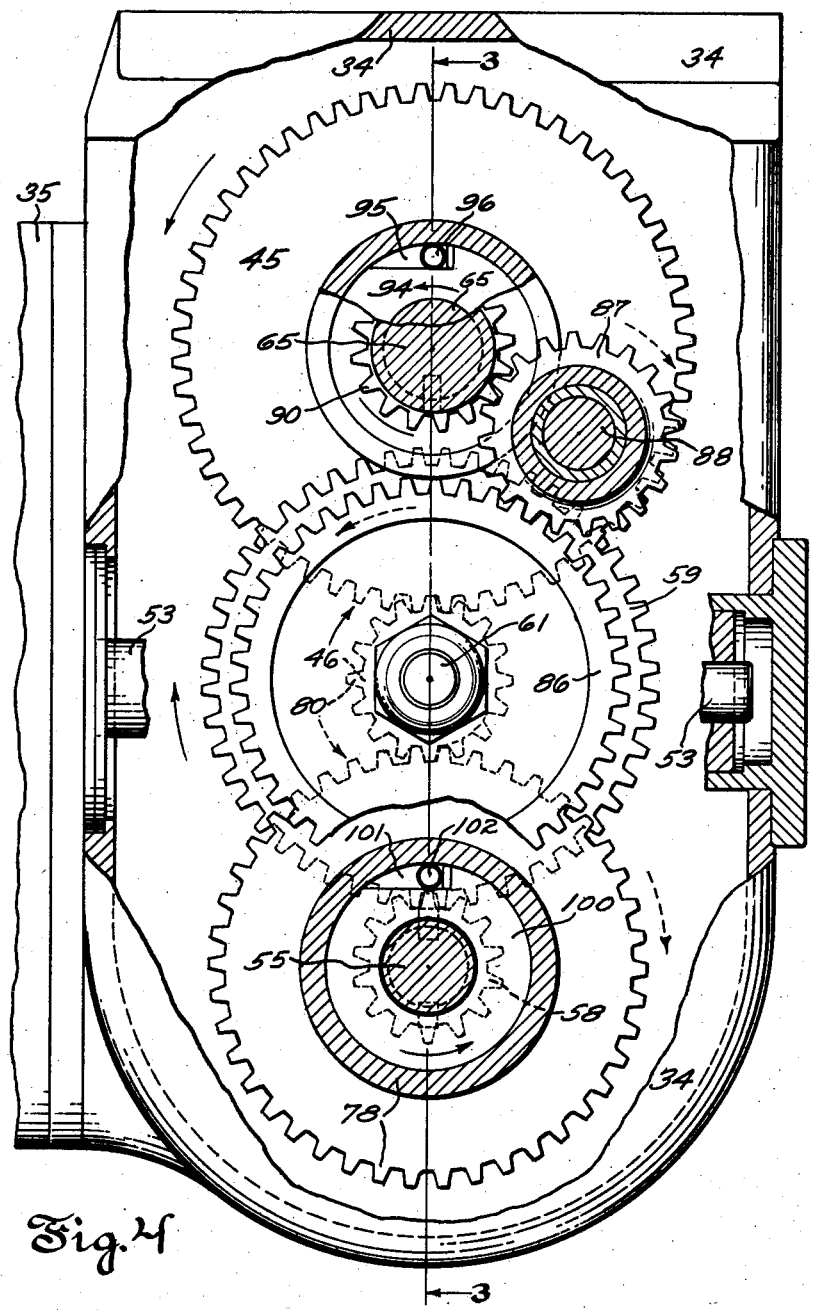
FIG. 4 is a view taken partially in section on the plane 4—4 in FIG. 3 looking in the direction of the arrows.

Reference to FIG. 3 in conjunction with FIGS. 2 and 4 will make clear that according to the present improvements for producing rapid traverse of the work table an auxiliary train of transmission gears is provided in parallel relation with the main train hereinbefore described. This auxiliary train comprises a gear 78 having a hollow hub that contains a ball bearing 79 by means of which gear 78 is supported to rotate freely on the power shaft 55. Gear 78 is constantly in mesh with a pinion 80 whose hub is journaled in the frame of the gear box by means of a ball bearing 81. The hub of pinion 80 is lined with a bearing sleeve 82 so as to be freely rotatable about shaft 61. Pinion 80 is unified with a gear 86 which is in mesh with an idler pinion 87 that is rotatably supported on a stationary stub shaft 88 (see FIG. 4). Shaft 88 projects inward from a boss 89 on the wall of the gear case. Idler pinion 87 is in mesh with a pinion 90 that is fixed on the load shaft 65. Thus the drive of load shaft 65 can at times take place, instead of through the aforesaid main train of gears, through the auxiliary train of gears 78, 80, 86, 87 and 90.

The drive through this auxiliary train is faster than through the main train and in the same direction with respect to load shaft 65 but can take place only when the power or input shaft 55 is rotating in a direction reverse to that in which the drive is transmitted by the main train to driven shaft 60. This is due to a second one-way clutch that includes a clutch disc 100 keyed to the power shaft 55 and containing a tapered notch 101 in its periphery occupied by a shiftable wedging roller 102. Clutch disc 100 occupies a space in the hollow of the hub of gear 78 beside the ball bearing 79.

FIGS. 5 to 8, inclusive, show apparatus drivingly connecting the output shaft 65 to the table feeding screw shaft 29 by means of the aforementioned pulley 47 and belt 36. The belt is entrained about a driven pulley 106 fixed on the outer end of a cross shaft 107 that is journaled in the rear wall of saddle 21. Bevel gear 108 is fixed on the inner end of cross shaft 107 and is constantly in driving mesh with both of two co-axial driven bevel gears 109 and 110 each journaled in a separate bearing 111 and 112 lodged in the frame structure of saddle 21 so that gears 109 and 110 derive positive axial thrust support from their bearings 111 and 112 which maintains them constantly in mesh with driving gear 106.

At one end portion the screw shaft 29 is journaled and free to turn in the hubs of gears 110, 109. At the other end the screw shaft is journaled in a stationary bearing 113 lodged in the framework of saddle 21 near the end wall thereof. Screw shaft 29 derives end thrust from its fixed collars 114 and 115 which prevent axial movement of the shaft. A handle (not shown) like 28 may be carried by the screw shaft outside the saddle 21 at the left end thereof in FIG. 1. The shaft passes through and may bear slidably in an end bracket 128 depending from the end of table 20.

The work table 20 is fed along the screw 29 by means of a nut 116 lodged fixedly in a lug 117 depending from the table between the ways 24 which guide the sliding travel of the table. The direction in which feed screw 29 will rotate and hence the direction in which table 20 will be fed through the transmission belt 36 and bevel gear 108 can be reversed by the axial shifting of a direction determining clutch member 118 having axially facing clutch teeth 119 and 120 on its opposite ends which engage respectively with mating clutch teeth 121 and 122 on the axially directed faces of bevel gears 109 and 110, respectively. In FIG. 5, clutch member 118 is shown in neutral position, i.e. none of the clutch teeth are engaged. A keyway 104 in clutch member 118 engaged by key 105 fixed in shaft 29 permits the clutch member to be shifted at will either to the left to clutch with gear 109 or to the right to clutch with gear 110 by means of any manually operable shifter device such as the yoke 123 fixed on the rod 124 which is slidable in bearings 125, 126 that fixedly extend from the framework of the saddle 21. Since gears 109 and 110 are constantly rotating in opposite directions, whether or not the screw 29 rotates, the direction of turning of the screw can completely be determined by means of the shifter handle 127 located outside the frame structure of the saddle as shown in FIGS. 1 and 5.

The full operation will be described with reference to FIG. 4, as a preferred actual construction, and to FIG. 2 as a diagrammatic representation of alternative constructions which more clearly shows the operative relationship of a main gear train and an auxiliary gear train involved in this improved system of gearing.

Assume that the load or output shaft 65 of the transmission is to be driven constantly counterclockwise in FIGS. 2 and 4, at slow speed on one occasion for rotating the feed screw 29 to advance the work table or carrier 20 lengthwise during machining of the work by the stationed rotary milling cutter 17, and at a much higher speed in the same counterclockwise direction for causing rapid traverse of the work table between sequential cutting operations on spaced portions of the same piece of work or on different work pieces spaced apart along the table. Slow rotation of output shaft 65 will be caused by the motor 35 when its direction of running is such as to cause input shaft 55 and pinion 58 to turn counterclockwise in FIG. 4, acting then through the main or slow train 58, 59, 46, 45 and one-way clutch 94, 96, 66, whose roller 96 will then bind in the notch 95 to drive the clutch disc 94 and load or output shaft 65 counterclockwise in FIG. 4. During this slow speed drive of the output shaft the one-way clutch 100, 101, 102 will disable the ability of the power or input shaft 55 to drive gear 78 of the auxiliary train because clutch roller 102 will slip in the notch 101 and hence clutch disc 100 which is keyed to input shaft 55 will not bind to drive gear 78 counterclockwise. However, because pinion 90 that is fixed to output shaft 65 will be turning, there will take place simultaneously a slow speed idling rotation (not transmitting power) of the auxiliary or fast train 87, 86, 80 and 78 in the directions indicated by the broken line arrows in FIG. 4.

Now when the direction of running of input shaft 55 is reversed to run clockwise as indicated by full line arrows in FIG. 2, either by conventional mechanical reversing mechanism (not shown) or by reversing the direction of running of motor 35 by means of the reversing switch 30, the clockwise rotation of one-way clutch disc 100 in FIG. 2 will cause roller 102 to bind in notch 101 and positively drive the hub of gear 78 of the auxiliary or fast train 78, 80, 86, 87, 90, whereby output shaft 65 is again or still driven counterclockwise as before, but at a much higher speed as the comparative diameter ratios of the gears in the slow and fast trains make evident. During this high speed drive the output shaft although the gears of the slow train still continue to rotate idly at relatively slow speed (without transmitting power) in the direction indicated by broken line arrows in FIG. 2 because so driven by pinion 58, the slow train at this time is deprived of driving relation to output shaft 65 in FIG. 2 because such driving ability is disabled by the free slipping of clutch roller 96 in notch 95 of the one-way clutch 94, 95 and 96, and because clutch disc 94 is turning at a higher rotary speed than the hub of gear 45 and overruns the same. FIG. 2 differs structurally from FIG. 4 only by depicting the single, frame stationed shaft 61 as two eccentrically related shafts both designated by the same reference character 61.

Another possible modification is shown in FIG. 9 wherein a differently constructed table feeding screw shaft 29' travels lengthwise with work table 20 and is journaled in a bearing bracket 129 depending fixedly from the left end of the table and in a bearing bracket 128' depending fixedly from the right end of the table. The bearings for the screw shaft 29' may be ball bearings 130 of axial thrust type in bracket 129 and 131 of the radial support type in bracket 128'. Outside of bearing brackets 129 and 128' screw shaft 29' is fitted with a conventional hand wheel 28' at both ends which travels with the table and is accessible for manually turning screw shaft 29' at all times.

The screw threads on shaft 29' are permanently enmeshed with a stationary nut 132 supported in the thickened side wall of the saddle 21 so that turning of the screw shaft feeds the table 20 lengthwise in either direction relatively to the saddle 21. In FIG. 9, the threaded length of the shaft passing with radial clearance axially through the hubs of the bevel gears 109 and 110 that turn in the bearings 111, 112 stationed on saddle 21 as aforesaid.

In FIG. 9 the key 105' is fixed in clutch member 118' and slidably fits a keyway 104 that extends the entire length of the screw threaded portion of shaft 29' so that, like clutch member 118, the clutch member 118' having a free axial sliding fit on the outside diameter of the screw threads can be shifted at will either to the left to clutch with gear 109 or to the right to clutch with gear 110 by means of any suitable shifter control as the yoke 123 in FIGS. 5 and 7 (not shown in FIG. 9).

These and other obvious modifications of the improved gearing system and table driving screw shaft construction will be recognized as possible within the principles of transmission gearing defined in the appended claims, and such variations are intended to be included in the coverage hereof.

What is claimed is:

1. A gearing system for transmitting motion from a constant speed rotatively reversible input shaft to a rotatively unidirectional output shaft at different speeds in a constant direction, comprising in combination with said shafts, a main train of permanently meshed speed reduction gears powered at its high speed end by said input shaft and connected to impel said output shaft to run at relatively low speed, an auxiliary train of permanently meshed speed step-up gears powered at its low speed end by said input shaft and connected to impel said output shaft to run at relatively high speed, whereby both of said trains are impelled simultaneously during both slow speed and high speed running of said output shaft, and one-way clutches cooperative respectively with each of said trains, at least one of said clutches being operative to disenable the drive of one of said trains by the other of said trains.

2. A gearing system as defined in claim 1, in which one of the said one-way clutches is arranged automatically to connect and disconnect said input shaft with respect to a gear of one of the said trains and the other of said one-way clutches automatically connects and disconnects the said output shaft with respect to a gear of the other of the said trains.

3. A gearing system as defined in claim 1, in which gears of both the said trains are mounted to rotate about permanently stationed axes additional to the axes of the said two shafts.

4. Power feeding mechanism as defined in claim 3, in which one of the said one-way clutches is interposed between the said input shaft and the said auxiliary train, and the other of said one-way clutches is interposed between the said main train and the said output shaft.

5. A gear system for transmitting motion at different speeds from a constant speed motor to a driven load comprising, the combination of, a composite transmission, an input shaft in said transmission to be motor driven, an output shaft in said transmission for driving a load, a main train of gears operatively connecting said input shaft to said output shaft having speed ratios operative to transmit motion at relatively slow speed from said input shaft to said output shaft during constant speed rotation of said input shaft in a first direction, said main train incorporating a one-way clutch connecting a gear of said main train to said output shaft arranged automatically to disable the transmitting of said slow speed motion by said main train to said output shaft during rotation of said input shaft in a direction reverse to said first direction, an auxiliary train of gears operative to transmit motion at relatively high speed from said input shaft to said output shaft during rotation of said input shaft at said constant speed in said reverse direction, said auxiliary train incorporating a one-way clutch arranged automatically to disable the transmitting of said high speed motion to said output shaft during rotation of said input shaft in said first direction.

6. A gearing system as defined in claim 1, together with a gang of selectively enmeshable speed change gears of variable ratios connected to be driven by the said input shaft through the said main train of gears and connected to drive the said output shaft through the said one-way clutch of the said main train at chosen low speeds, whereby any of said low speeds can be converted to a super speed of work carrier traverse by reversal of the direction of rotation of said input shaft.

References Cited by the Examiner

UNITED STATES PATENTS

| | | | |
|---|---|---|---|
| 381,525 | 4/88 | Brainard | 90—21 |
| 502,131 | 7/93 | McClellan | 74—424.8 |
| 1,125,686 | 1/15 | Hazelton et al. | 90—21 |
| 2,069,701 | 2/37 | Emmons | 90—21 |
| 2,344,529 | 3/44 | Armitage | 90—21 |
| 2,592,799 | 4/52 | Forward et al. | 90—21 |
| 2,694,940 | 11/54 | Schmitter | 74—812 |

FOREIGN PATENTS

| | | |
|---|---|---|
| 1,159,026 | 2/58 | France. |
| 98,676 | 11/52 | U.S.S.R. |

WILLIAM W. DYER, JR., Primary Examiner.

BROUGHTON G. DURHAM, Examiner.